(12) United States Patent
Dechamps

(10) Patent No.: US 6,977,581 B2
(45) Date of Patent: Dec. 20, 2005

(54) METHOD FOR AUTHORIZING UNLOCKING AND/OR STARTING OF A MOTOR VEHICLE AND ASSOCIATED DEVICE

(75) Inventor: Kathleen Dechamps, Choisy le Roi (FR)

(73) Assignee: Valeo Electronique, Creteil (FR)

( * ) Notice: Subject to any disclaimer, the term of this patent is extended or adjusted under 35 U.S.C. 154(b) by 0 days.

(21) Appl. No.: 10/487,499

(22) PCT Filed: Aug. 13, 2002

(86) PCT No.: PCT/EP02/09062

§ 371 (c)(1),
(2), (4) Date: Jun. 7, 2004

(87) PCT Pub. No.: WO03/019481

PCT Pub. Date: Mar. 6, 2003

(65) Prior Publication Data

US 2004/0232771 A1 Nov. 25, 2004

(30) Foreign Application Priority Data

Aug. 23, 2001 (FR) ................................. 01 11278

(51) Int. Cl.$^7$ ............................................ B60R 25/10
(52) U.S. Cl. ................... 340/426.36; 340/426.28; 340/426.27; 340/426.29; 340/426.1; 340/825.69; 340/825.72; 307/10.02; 307/10.03
(58) Field of Search ..................... 340/426.36, 426.1, 340/426.13, 531, 539.1, 825.69, 825.72, 340/426.28, 426.27, 426.29; 307/10.1, 10.2, 307/10.3, 10.5; 180/287, 828

(56) References Cited

U.S. PATENT DOCUMENTS

| 5,767,784 A | * | 6/1998 | Khamharn | 340/5.23 |
| 5,937,065 A | * | 8/1999 | Simon et al. | 380/262 |
| 6,144,315 A | * | 11/2000 | Flick | 340/825.69 |

FOREIGN PATENT DOCUMENTS

| EP | 0923054 | 6/1999 | G07C 9/00 |
| EP | 1077301 | 2/2001 | E05B 49/00 |
| FR | 2781076 | 1/2000 | G08C 19/00 |
| FR | 2794882 | 12/2000 | G07C 11/00 |

* cited by examiner

*Primary Examiner*—Hung Nguyen
(74) *Attorney, Agent, or Firm*—Osha Liang LLP

(57) ABSTRACT

A method for identifying and authorizing unlocking or starting of a motor vehicle for a hands-free access system includes a central unit exchanging identification messages with identification units according to a communication procedure. The communication procedure includes emitting an identification message from the central unit to the identification units, emitting a message indicating a presence of the identification units having received the identification message to the central unit, emitting a selection message by the central unit to select one particular identification unit to reply to the identification message, and emitting an additional identification message, where at least one of the emitting of a message indicating the presence of the identification units and the emitting of the selection message is performed between emitting the identification message and the emitting of the additional identification message so as to enhance the security of interchange between the central unit and the identification units.

18 Claims, 3 Drawing Sheets

B3

B2

B1

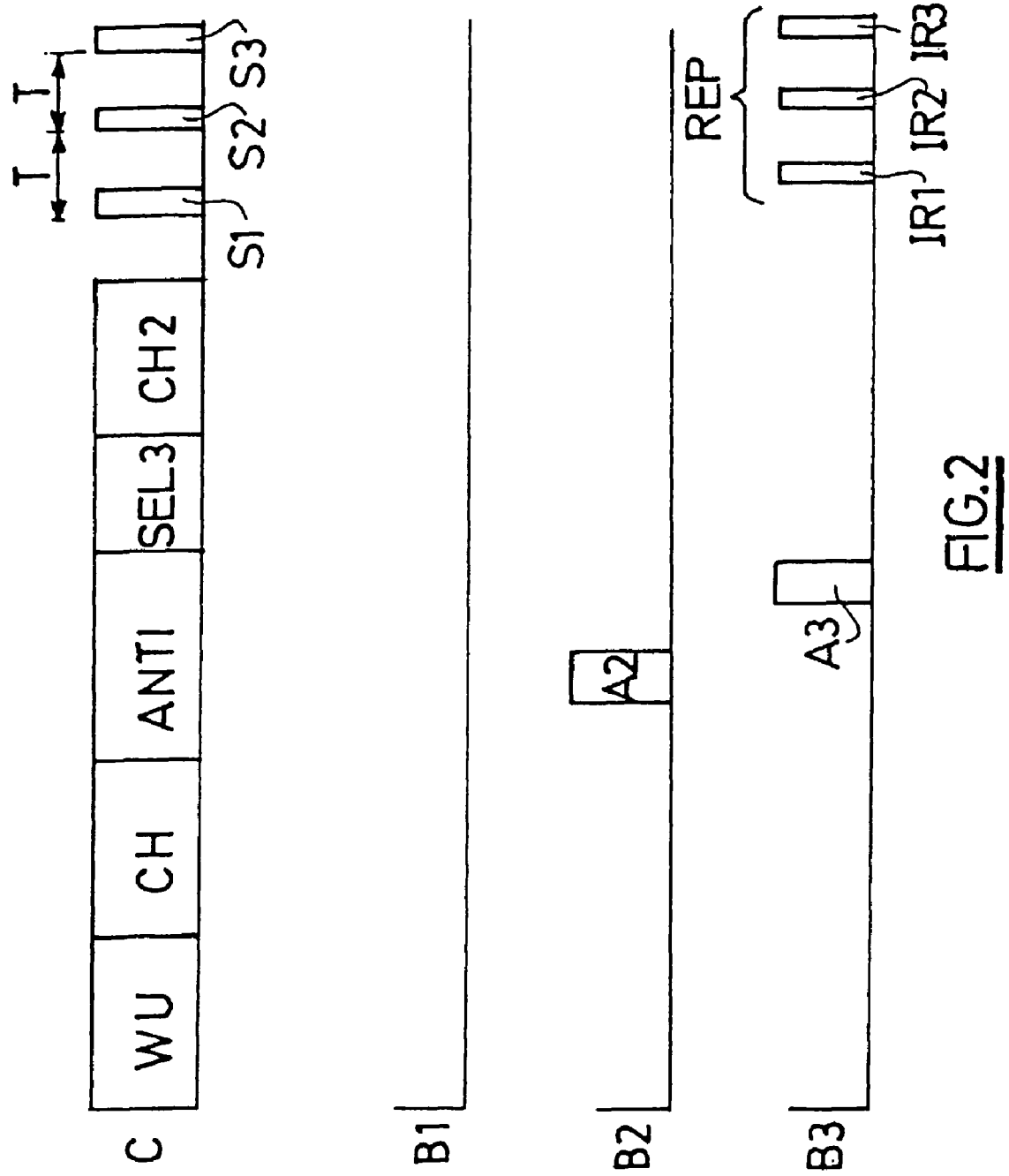

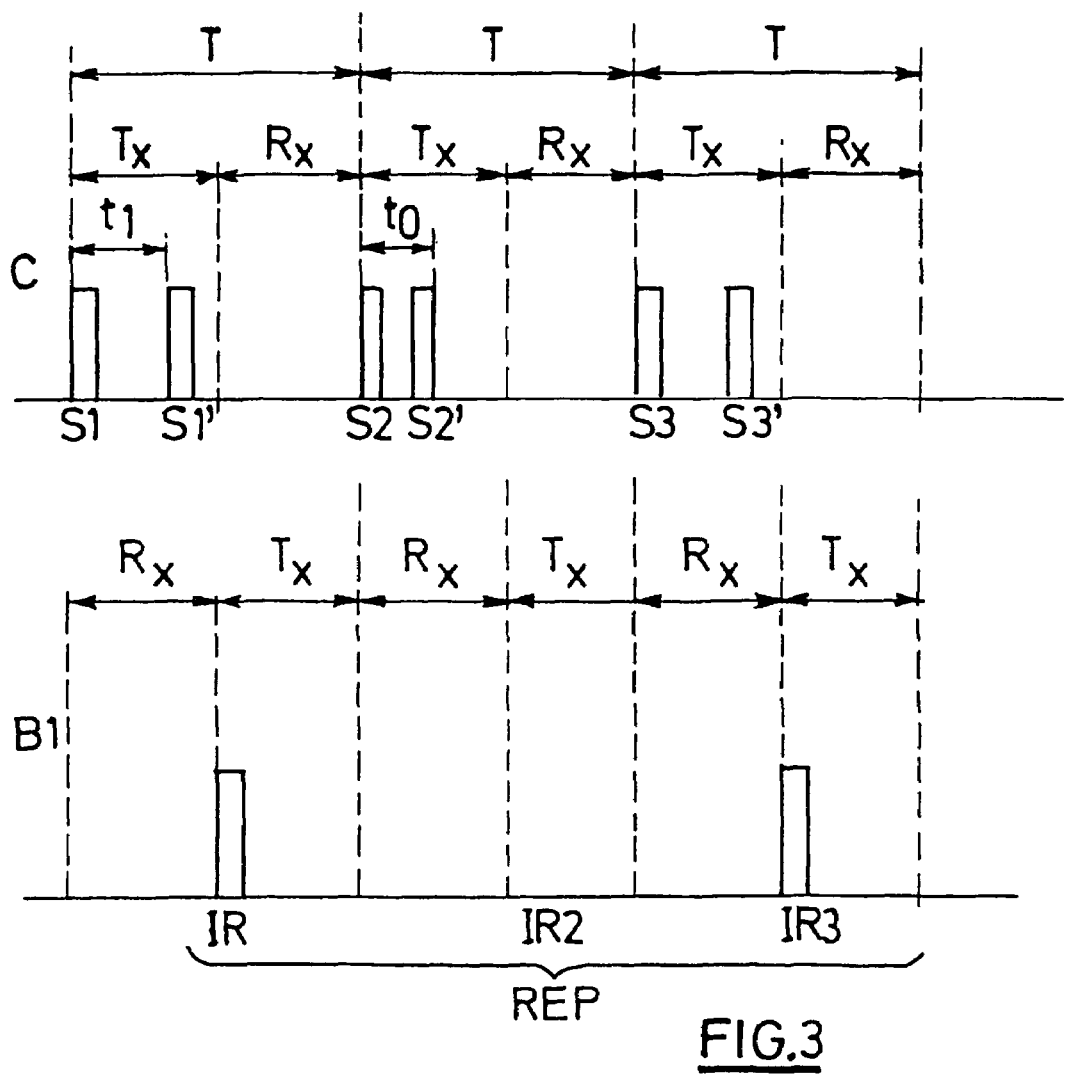
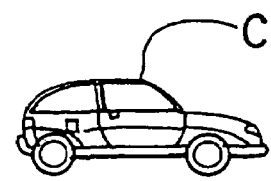
FIG.4

METHOD FOR AUTHORIZING UNLOCKING AND/OR STARTING OF A MOTOR VEHICLE AND ASSOCIATED DEVICE

CROSS-REFERENCE TO RELATED APPLICATIONS

This application is a national stage application based on International Application No. PCT/EP02/090/62 filed Aug. 13, 2002 which claims priority of French patent application number 01/11278 filed on Aug. 23, 2001.

FIELD OF THE INVENTION

The invention concerns a method for identifying and authorizing unlocking and/or starting of a motor vehicle, for a so-called hands-free motor vehicle access system, and an associated identification and authorization device.

Such an access system is represented schematically in FIG. 4. It comprises a central unit C, mounted in the vehicle, which exchanges identification data with identification units B1, B2, B3. Each identification unit, often referred to as a badge, is generally carried by a user. When the central unit C recognizes a badge, it authorizes unlocking or starting of the vehicle.

BACKGROUND OF THE INVENTION

In order to better appreciate the invention, it is helpful to present a known communication procedure and its disadvantages.

FIG. 1 shows the communication diagram of a central unit C of such a system along with the communication diagrams of the badges B1, B2, B3 dialoging with this unit.

After a pre-defined triggering action, for example a user approaching a handle of the vehicle, the central unit C of the access system switches to transmit mode and sends a so-called wake-up (WU) message.

If a user carrying a badge B1 is near the vehicle, the badge detects this wake-up message and switches to listening mode.

The central unit then emits an coded identification message CH, then chooses the badge with which it will communicate to avoid several badges simultaneously sending a response. This step of the communication protocol comprises two phases generally called the anti-collision phase ANTI and the selection phase SEL.

During the anti-collision phase ANTI, badges present around the vehicle emit a message indicating their presence. In the example shown in FIG. 1, badges B1, B3 located near the vehicle each send a pulse A1, A3 indicating their presence.

During the selection phase SEL, the central unit selects a badge by sending a pulse SEL1 characteristic of the badge B1 it has chosen. The other badge B3 then puts itself in standby mode.

The central unit then emits synchronization pulses S1, S2, S3 at regular time intervals T. On reception of each synchronization pulse, the selected badge B1 emits a coded response pulse IR1 which is a part of the response message REP. The synchronization pulses S1, S2, S3 enable the processing time of the badge to be measured. This time measurement, usually called the anti-pirate stage, enables the unlocking to be inhibited when malevolent people equipped with pirate transmit/receive units attempt to steal the vehicle. In effect, when pirate transmit/receive units are interposed between the badge and the vehicle, the central unit receives the pulse of the response message IR1 after a time longer than the processing time of the badge T owing to the delay introduced by the processing time of the pirate units.

However, the security of a communication procedure of this type is insufficient, since we could imagine that the pirate units mask the delay that they introduce by eliminating the anti-collision ANTI and selection SEL phases. In particular, pirates can trigger the communication procedure, and, after amplification, send to the badge the wake-up WU and identification CH messages. Next they interrupt the communication with the central unit and generate synchronization pulses. They receive the response pulses generated by the badge and return them to the central unit, at the right moment. Consequently, the central unit cannot detect the presence of the pirate units, and the security of the vehicle access system is compromised.

SUMMARY OF THE INVENTION

One object of the present invention is an identification procedure offering a higher level of security.

To this end, the invention proposes a method for identifying and authorizing unlocking or starting of a motor vehicle for a hands-free access system, comprising a central unit exchanging identification messages with identification units according to a communication procedure, said procedure including:
  a step that consists in emitting an identification message from the central unit to the identification units;
  a step that consists in emitting a message indicating the presence of said identification units having received the identification message to the central unit;
  a step that consists in emitting a selection message by the central unit to select one particular identification unit to reply to the identification message;
wherein the procedure includes a step that consists in emitting an additional identification message, and wherein said step of sending a presence indication message and/or said step of sending a selection message is performed between said step of sending an identification message and said step of sending the additional identification message so as to enhance the security of interchange between said central unit and said identification units.

In this manner, the step of sending the additional identification message is immediately followed by the step of reception of the response message such that a delay introduced after the step of emission of the additional identification message is always detected by the central unit.

The procedure according to the invention can also include one or more of the following characteristics:
  the additional identification message depends on the identification message to enhance the security of the communication procedure;
  the central unit is able to calculate part of the response message as soon as the identification message is received to reduce the duration of the communication procedure;
  the identification message is a random number generated by the central unit;
  the procedure also includes:
    a step that consists in emitting synchronization pulses from the central unit to the particular identification unit;
    a step that consists in emitting a response message from the particular identification unit to the central unit, this response message comprising at least two response pulses, the response pulses being emitted by the identification unit only after reception of the synchronization pulses so as to measure the processing time of the identification unit, the synchronization pulses being coded so as to contain the additional identification message to reduce the duration of the communication procedure;

the synchronization pulses are coded by modulation of their positions the synchronization pulses are coded by modulation of their widths These characteristics also enable the duration of the communication procedure to be advantageously reduced, so that the user only has to wait a few seconds before the vehicle door opens, which increases the comfort of use.

The present invention also includes an identification and authorization device or a motor vehicle starting device offering a high level of security.

To this end, the invention proposes a device for identifying and authorization unlocking or starting of a motor vehicle comprising a central unit exchanging identification messages with identification units according to a communication procedure, said central unit being able to send an identification message to said identification units and a selection message to a particular identification unit, said identification units each being able to send a message indicating their presence, wherein said device is able to send an additional identification message and wherein said message indicating presence and/or said selection message is sent after sending said identification message and before sending said additional identification message so as to enhance the security of the interchange between said central unit and said identification units.

Advantageously, the central unit emits synchronization pulses to the particular identification unit which emits response pulses on receiving the synchronization pulses, which enables the processing time of the particular identification unit to be measured. The synchronization pulses are coded so as to contain the additional identification message to reduce the duration of the communication procedure.

The invention will be better understood on reading the detailed description below of an embodiment, which is non-limitative and taken only as an example, with reference to the attached drawings of which:

BRIEF DESCRIPTION OF THE DRAWINGS

FIG. 2 is a diagram of the communication protocol between a computer and identification units according to an embodiment of the present invention, FIG. 3 is a diagram of a part of the communication protocol according to a possible enhancement of an embodiment of the present invention, FIG. 4 illustrates a hands-free access system.

DETAILED DESCRIPTION

Figure 1:
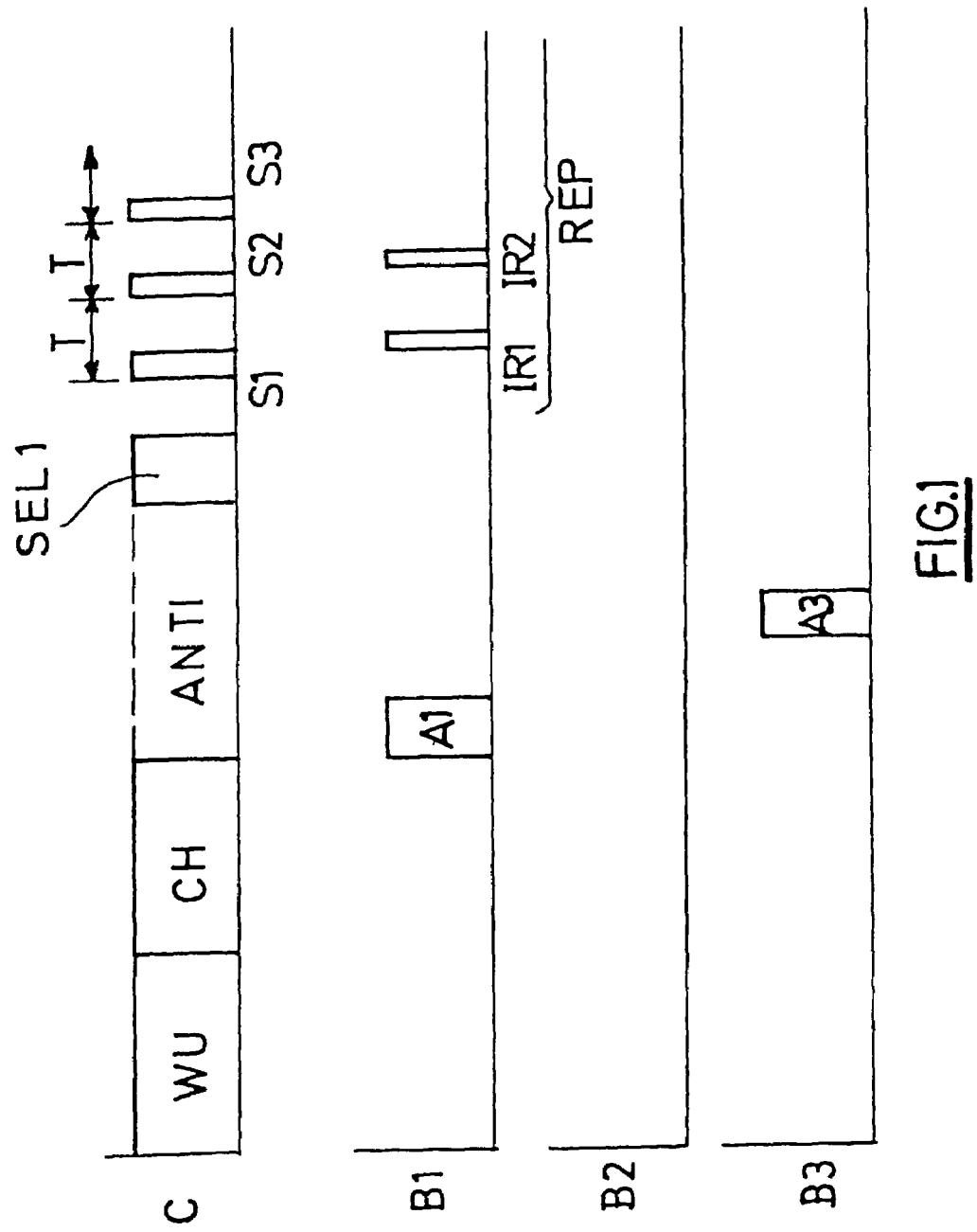
FIG. 1 is a diagram of a communication protocol according to the prior art, already described in the introductory part of the description.

The steps of the communication procedure according to the invention that are identical to steps of the prior art procedure carry the same references.

According to the invention, the communication procedure includes an additional identification message CH2.

As seen in FIG. 2, this message is immediately followed by the step of reception of the response message REP.

Consequently, if pirate units are interposed between the badge B3 previously selected and the central unit C, the pulses of the response message IR1 are necessarily received with a delay corresponding to the processing time of the pirate units. In this manner the communication procedure according to the invention provides a higher level of security than a classic communication procedure.

In effect, since the sending of the additional identification message CH2 is directly followed by sending of the response message REP, no part of the communication procedure can be eliminated to mask the delay introduced by the pirate units.

Obviously the additional identification message CH2 is necessary to give the authorization to send the response message such that it can not be truncated.

It can, for example, contain a function of the encryption key indispensable to calculate the response message.

Advantageously, the additional identification message CH2 also contains a coded function of the identification message CH so as to increase, by encryption, the security of the communication between the badge and the vehicle's computer.

The identification message CH is either a random number generated by the central unit C, or a pre-registered number.

Advantageously, the identification message CH is emitted before the anti-collision ANTI and selection SE phases. In this manner, the microcontroller of the badge pre-computes the response message REP during the anti-collision and selection phases such that after reception of the additional identification message (CH2), the response message is computed faster, which therefore reduces the duration of the communication procedure.

FIG. 3 represents schematically part of a communication diagram between the central unit C and a badge B1 selected according to an enhancement of the present invention.

This enhancement enables the length of the communication procedure to be reduced and consequently it improves significantly the usability of a hands-free access system.

According to this enhancement, the synchronization pulses S1, S2, S3 are coded so as to contain an identification message. In this way, the additional identification message CH2 can, for example, be transmitted simultaneously with the synchronization. The coding can be performed by modulation according to the width or position of the synchronization pulses.

In the embodiment of the present invention shown in FIG. 3, the synchronization and identification data are contained in the emitted pairs of pulses S1, S1', S2, S2', S3, S3'. A pair of pulses is constituted by a first pulse S1 and a second pulse S2. The first pulses S1, S2, S3 are always emitted at a constant time interval T. They thereby form the synchronization of the signal. The second pulses S1', S2', S3' contain the additional identification message CH2.

For example, according to FIG. 3, the pulses S1' and S3' emitted after a time t1 defined relative to the emission of the first pulses S1 and S3, code a data item corresponding to 1. The pulse S2' emitted after a pre-defined time t0 defined relative to the emission of the first pulse S2, codes a data item corresponding to 0.

After reception of a pair of pulses S1, S1', the badge emits a pulse of the response message IR1 during the period T. If the central unit receives no reply during time T, the central unit stops the communication procedure. In this manner the anti-pirate function is always executed.

As in a classic communication procedure, the response pulses IR1, IR2 are coded. We can for example choose to send a pulse IR1 to code a data item equal to 1 but not send a pulse IR2 to code a data item equal to 0. The coding can also be performed by means of the pulse width or a modulation of their positions.

According to an advantageous variant, the same antenna is used to receive and transmit messages. This antenna is connected via a switch to a transmit amplifier stage and to a receive amplifier stage. A microcontroller controls the switching frequency of this switch. The patent application number FR 2 794 603 filed by the applicant of the present invention describes a bidirectional transmission system of this type.

If a single antenna is used, the communication procedure of badge B1 and the computer C include alternating emission steps Tx and reception steps Rx of the data, of the same period but with opposite phase.

As seen in FIG. 3, after reception of a pair of pulses, the badge switches to transmit mode Tx and emits a response pulse. Simultaneously, the central unit switches to receive mode Rx. The communication procedure therefore enables bit-by-bit interchange of the data at the same frequency, for example (in the case of radio frequency) at 315, 434 or 868 MHz.

The first pulses S1, S2, always provide the synchronization function, since the badge needs this synchronization to start its reception phase at a regular time interval and to obtain a precise measurement of the distance between the badge and the central unit. Thanks to this synchronization, the communication procedure is faster and more efficient.

Obviously the badge and the central unit could each have two antennas, in which case one antenna is dedicated to message emissions and the other to message receptions.

What is claimed is:

1. A method for identifying and authorizing unlocking or starting of a motor vehicle for a hands-free access system, comprising:
   a central unit exchanging identification messages with identification units according to a communication procedure, said communication procedure comprising:
      emitting an identification message from the central unit to the identification units;
      emitting a message indicating a presence of said identification units having received the identification message to the central unit;
      emitting a selection message by the central unit to select one particular identification unit to reply to the identification message; and
      emitting an additional identification message,
      wherein at least one of the emitting of the message indicating the presence of the identification units and the emitting of the selection message is performed between emitting the identification message and emitting the additional identification message so as to enhance security of interchange between said central unit and said identification units.

2. The method according to claim 1, wherein said additional identification message depends on said identification message to enhance the security of the communication procedure.

3. The method according to claim 1, wherein said central unit computes a response message on reception of said identification message to reduce a duration of the communication procedure.

4. The method according to claim 1, wherein said identification message is a random number generated by said central unit.

5. The method according to claim 1 further comprising:
   emitting synchronization pulses from said central unit to one of the identification units; and
   emitting a response message from the one of the identification units to said central unit,
   wherein the response message comprises at least two response pulses,
   wherein the response pulses are emitted by said identification unit only after reception of the synchronization pulses so as to measure a processing time of the identification unit, and
   wherein said synchronization pulses are coded so as to contain said additional identification message to reduce a duration of the communication procedure.

6. The method according to claim 5, wherein said synchronization pulses are coded by modulation of their positions.

7. The method according to claim 5, wherein said synchronization pulses are coded by modulation of their widths.

8. A device for identifying and authorizing unlocking or starting of a motor vehicle for a hands-free access system, comprising:
   a central unit exchanging identification messages with identification units according to a communication procedure,
   wherein said central unit is able to send an identification message to said identification units and a selection message to a particular identification unit,
   wherein said identification units are each able to send a message indicating their presence; and
   wherein said device is able to send an additional identification message, and
   wherein at least one of said message indicating presence and said selection message is sent after sending said identification message and before sending said additional identification message so as to enhance the security of the interchange between said central unit and said identification units.

9. The device according to claim 8, wherein said central unit emits synchronization pulses to one of the identification units,
   wherein the one of the identification units emits response pulses after reception of said synchronization pulses to measure a processing time of the one of the identification units, and
   wherein said synchronization pulses are coded so as to contain said additional identification message to reduce a duration of said communication procedure.

10. The method according to claim 2, wherein said central unit computes the response message on reception of said identification message to reduce a duration of the communication procedure.

11. The method according to claim 2, wherein said identification message is a random number generated by said central unit.

12. The method according to claim 3, wherein said identification message is a random number generated by said central unit.

13. The method according to claim 2 further comprising:
   emitting synchronization pulses from said central unit to one of the identification units;
   emitting a response message from the one of the identification units to said central unit,
   wherein this response message comprises at least two response pulses, wherein the response pulses being emitted by said identification unit only after reception of the synchronization pulses so as to measure a processing time of the identification unit, and wherein said synchronization pulses are coded so as to contain said additional identification message to reduce a duration of the communication procedure.

14. The method according to claim 3 further comprising:

emitting synchronization pulses from said central unit to one of the identification units;

emitting a response message from the one of the identification units to said central unit, wherein this response message comprises at least two response pulses, wherein the response pulses being emitted by said identification unit only after reception of the synchronization pulses so as to measure a processing time of the identification unit, and wherein said synchronization pulses are coded so as to contain said additional identification message to reduce a duration of the communication procedure.

15. The method according to claim 4 further comprising:

emitting synchronization pulses from said central unit to one of the identification units;

emitting a response message from the one of the identification units to said central unit, wherein this response message comprises at least two response pulses, wherein the response pulses being emitted by said identification unit only after reception of the synchronization pulses so as to measure a processing time of the identification unit, and wherein said synchronization pulses are coded so as to contain said additional identification message to reduce a duration of the communication procedure.

16. A method for identifying and authorizing unlocking or starting of a motor vehicle for a hands-free access system, comprising:

a central unit exchanging identification messages with identification units according to a communication procedure, said communication procedure comprising:

emitting an identification message from the central unit to the identification units;

emitting a message indicating a presence of said identification units having received the identification message to the central unit;

emitting a selection message by the central unit to select one particular identification unit to trigger the particular identification unit to reply to the identification message; and emitting an additional identification message, wherein at least one of the emitting of the message indicating the presence of the identification units and the emitting of the selection message is performed between emitting the identification message and the emitting of the additional identification message so as to enhance the security of interchange between said central unit and said identification units;

emitting synchronization pulses from said central unit to the particular identification unit; and emitting a response message from the particular identification unit to said central unit, wherein the response message comprises at least two response pulses, wherein the response pulses are emitted by said particular identification unit only after reception of the synchronization pulses so as to measure a processing time of the particular identification unit, and wherein said synchronization pulses are coded so as to contain said additional identification message to reduce a duration of the communication procedure.

17. A device for identifying and authorizing unlocking or starting of a motor vehicle for a hands-free access system, comprising:

a central unit exchanging identification messages with identification units according to a communication procedure, wherein said central unit is configured to send an identification message to said identification units and a selection message to a particular identification unit, wherein said identification units are each configured to send a message indicating their presence, wherein said device is configured to send an additional identification message, wherein at least one of said message indicating presence and said selection message is sent after sending said identification message and before sending said additional identification message so as to enhance the security of the interchange between said central unit and said identification units, wherein said central unit emits synchronization pulses the particular identification unit, wherein the particular identification unit emits response pulses after reception of said synchronization pulses to measure a processing time of the particular identification unit, and wherein said synchronization pulses are coded so as to contain said additional identification message to reduce a duration of said communication procedure.

18. A device for reducing unauthorized access to a motor vehicle hands-free access system, comprising:

a central unit;

a plurality of identification units;

wherein the central unit is configured to send a first identification message to the plurality of identification units;

wherein the identification units are configured to send presence messages to the central unit indicating a presence of the identification units;

wherein the central unit is configured to send a selection message and a second identification message to a particular identification unit;

wherein the particular identification unit is configured to a response message to the central unit;

wherein at least one of the presence messages and the selection message is sent after sending the first identification message and before sending the second identification message; and wherein the response message follows the second identification message to reduce unauthorized access to the motor vehicle hands-free access system.

* * * * *